Aug. 22, 1933.       R. H. DARBORD       1,923,916
FIELD STRENGTH MEASUREMENT FOR ULTRA-SHORT WAVES

Filed July 10, 1931

INVENTOR
RENE' H. DARBORD
BY R.C. Hopgood
ATTORNEY

Patented Aug. 22, 1933

1,923,916

UNITED STATES PATENT OFFICE 1,923,916

FIELD STRENGTH MEASUREMENT FOR ULTRA-SHORT WAVES

René H. Darbord, Paris, France, assignor to International Communications Laboratories, Inc., New York, N. Y., a Corporation of New York Application July 10, 1931. Serial No. 549,929

4 Claims. (Cl. 250—2)

My invention relates to improvements in measurement of electric field strength, both immediately adjacent to, and at a considerable distance from a radiating source of micro-rays, that is, electromagnetic waves lying generally in the range between 1 and 100 centimeters.

An object of my invention is the provision of a specially designed electric field strength measurement assembly which will enable direct reading measurement of electric field strength to be made at such distances from an antenna radiating ultra-high frequency as will facilitate the plotting of the directivity curve for the radiating antenna in association with its focusing apparatus.

Another object of my invention is the provision of a simple portable assembly for the measurement of electric field strength immediately adjacent to an antenna radiating ultra-short waves without undue distortion of the existing field by the apparatus assembly.

Conventional means of measuring electric field strength heretofore have made use of a receiving antenna associated with a calibrated high frequency amplifier. By utilizing the calibration, a correspondence is obtained between output meter readings and incident electric field strength.

In the field of ultra-short waves, amplifiers have not at present been developed, so that indications of the output meter depend solely on the energy which may be focused upon the receiving antenna.

It is a purpose of the present invention to demonstrate that, by utilizing certain focusing devices, together with means for effecting optimum transfer of energy from the receiving antenna to the detecting thermocouple, sufficient energy may be made available to enable field strength measurements to be made several hundred meters from an antenna radiating ultra-high frequency waves of wave-length approximately 20 centimeters.

My invention is illustrated in the accompanying drawing wherein.

Figure 1:
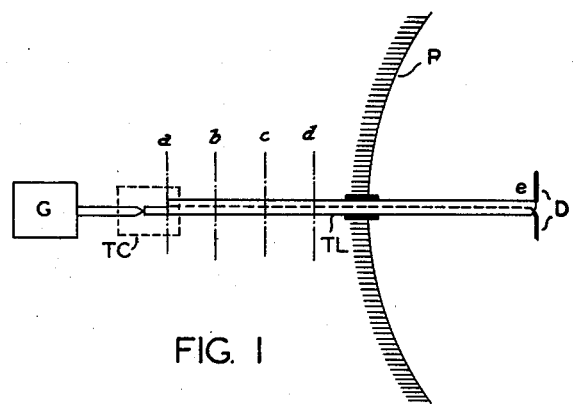
Fig. 1 shows one form of my invention using a parabolic reflector.

Fig. 1 indicates the apparatus that would be used for measurements at some distance from the radiating antenna. D designates the receiving antenna of conventional character. R is a paraboloidal reflector, metallized on the antenna side, and having a diameter of about one meter. Through the middle of the reflector R, a transmission line TL passes, connecting the antenna D to the thermocouple TC. This transmission line formed of concentric conductors is made up of four sections. Section $ab$ is adjustable as to length and may have its length so chosen that the reactance of the line $ab$ just annuls the reactance of the terminal elements. Section $bc$ articulates $ab$ to $cd$. Section $cd$ is so constructed that its surge impedance may be varied mechanically; this allows perfect matching of the radiation resistance of the antenna to the resistance of the thermocouple. Section $de$ serves to space the antenna at a suitable distance in front of the parabolic reflector.

Adjustable concentric conductors of this type, to which reference is made, are disclosed in my U. S. Letters Patent No. 1,921,117.

If the line has practically no dissipation of energy along its length, it will transfer 50% of the energy incident on the antenna to the thermocouple. It can be seen, therefore, that the deflections of the galvanometer G give a measure of incident energy and hence field strength, when the transmission line is suitably adjusted.

The parabolic reflector R serves to focus energy on the antenna. The multiplying factor of this reflector may be obtained by a calibration. The thermocouple may be calibrated with direct current, since the deflections are proportional to incident power, and hence the necessity of taking account of skin effect is eliminated.

Figure 2:
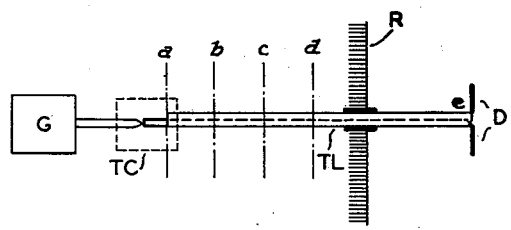
Fig. 2 is a modification of Fig. 1 using a plane reflector.

Fig. 2 differs from Fig. 1 in the employment of a small plane reflector in place of a large paraboloidal reflector. For measurements immediately adjacent to the radiating antenna, sufficient energy is available to obviate the necessity of the large multiplying power of the paraboloidal reflector. Hence, a small plane reflector is used. This gives a multiplying factor of about 2 for the field strength, providing its dimensions are at least a few wave-lengths long and yet its size is not such as to seriously distort the field in its immediate neighborhood.

What is claimed is:

1. Apparatus for measuring electric field strength of micro-rays, comprising a receiving antenna, a plane reflector, a thermocouple and an associated meter, and a transmission line composed of adjustable concentric conductors for connecting said receiving antenna with said thermocouple.

2. Apparatus for measuring the electric field strength of micro-rays, comprising an antenna, a reflector, a thermocouple and associated meter, and a transmission line comprising two concentric conductors adjustable as to length and extending through said reflector and between said antenna and said thermocouple to connect the latter with the former.

3. A micro-ray field strength measuring instrument comprising an antenna, indicating means, a transmission line comprising two concentric conductors each extending from and connecting said antenna to said indicating means, said conductor serving to connect said antenna with said indicating means, and means for adjusting said transmission line so that the indication of said indicating means bears a fixed relationship to the field strength.

4. Apparatus for measuring the electric field strength of micro-rays comprising, a parabolic reflector, a receiving antenna positioned at the focus of the reflector, a thermocouple, a meter associated with said thermocouple, and a transmission line composed of two concentric conductors, each adjustable as to length and extending through the reflector and between said receiving antenna and said thermocouple.

RENÉ H. DARBORD.